| United States Patent [19] | [11] Patent Number: 5,281,682 |
|---|---|
| Cornforth et al. | [45] Date of Patent: Jan. 25, 1994 |

[54] RADIATION CURABLE COMPOSITIONS AND METHOD OF USE

[75] Inventors: David A. Cornforth, Rochdale; Dawn Fowler, Water Rossendale, both of England; Walter L. Renz, Macungie, Pa.

[73] Assignee: Air Products and Chemicals, Inc., Allentown, Pa.

[21] Appl. No.: 845,284

[22] Filed: Mar. 3, 1992

[51] Int. Cl.$^5$ .................. C08F 224/00; C08F 226/02; C08F 220/10; C08G 71/04; C08G 63/00

[52] U.S. Cl. ............................ 526/273; 526/307.2; 526/328.5; 528/271; 525/920

[58] Field of Search ................... 525/296; 526/273

[56] References Cited

U.S. PATENT DOCUMENTS

| 3,874,906 | 4/1975 | Prucnal et al. | 117/93.31 |
|---|---|---|---|
| 4,129,709 | 12/1978 | Lorenz et al. | 526/264 |
| 4,348,427 | 9/1982 | Priola et al. | 427/44 |
| 5,106,875 | 4/1992 | Horn et al. | 521/137 |

*Primary Examiner*—Joseph L. Schofer
*Assistant Examiner*—Wu C. Cheng
*Attorney, Agent, or Firm*—Mark L. Rodgers; William F. Marsh; James C. Simmons

[57] ABSTRACT

Improved radiation curable compositions are provided which comprises N-vinylformamide and an oligomer selected from the group consisting of epoxy-acrylate resins, polyester acrylate resins, polyurethane acrylate resins and mixtures thereof. A photoinitiator is also added to the composition. A process is also provided whereby the composition is applied to the surface of a substrate and subsequently exposed to a radiation source until an adherent dry polymerized film is formed on the substrate. These compositions are useful as pigmented and unpigmented coatings, printing inks, adhesives and the like.

8 Claims, No Drawings

RADIATION CURABLE COMPOSITIONS AND METHOD OF USE

FIELD OF THE INVENTION

The present invention relates to the formulation and applications of radiation curable compositions suitable for use as pigmented or unpigmented coatings, printing inks, adhesives and other applications.

BACKGROUND OF THE INVENTION

Radiation curable acrylic oligomers are usually comparatively high viscosity species and require to be blended with a monomer in order to produce a radiation curable formulation of the appropriate viscosity for any particular application. Such oligomers generally fall into three broad groups of resin, namely epoxy-acrylates, polyester acrylates and polyurethane acrylates.

The epoxy-acrylates include the B-hydroxy esters which are generated by the reaction of acrylic acid or methacrylic acid with an epoxy resin or epoxy-novolak resin. The polyester acrylates consist of polyesters which have been esterified with acrylic acid to yield a polyester with acrylate ester terminal groups, using well established esterification techniques. The polyurethane acrylates consist of reaction products of a hydroxy-containing acrylate ester, usually 2-hydroxyethyl acrylate or hydroxy propyl acrylate with an isocyanate prepolymer.

The monomers which are blended with the above acrylic oligomers in order to yield a practical radiation curable formulation in the presence of a suitable photoinitiator fall into three groups defined by functionality, and may be mono-, di- or poly-functional.

Poly-functional monomers,- usually with a functionality of 3 or 4, generally consists of acrylate esters of tri or tetra-functional alcohols. Commonly used materials include glycerol triacrylate, trimethylol propane triacrylate, trimethylol ethane triacrylate, pentaerythritol tetracrylate, together with the acrylates of the ethoxylates or propoxylates of the above alcohols.

Di-functional monomers consist usually of the acrylate esters of ethylene glycol or propylene glycol and their oligomers, with tripropylene glycol diacrylate being especially preferred, diacrylates of longer chain alcohols such as hexanediol diacrylate and acrylate esters of cycloaliphatic diols such as the cyclohexane diols.

Mono functional monomers consist of the acrylate esters of mono functional alcohols such as octanol, nonanol, decanol, dodecanol, tri decanol and hexadecanol both in their linear and branch chain forms. Also included are cyclohexyl acrylate and its alkyl derivatives such as t-butyl cyclohexyl acrylate, tetrahydro furfuryl acrylate. N-vinylpyrrolidone has also been used as a mono-functional monomer. Styrene is used in certain formulations but is not widely used in this technology due to triplet quenching.

High functionality monomers give rapid cure speeds and high cross-link density, leading to films of high hardness and tensile strength with excellent chemical resistance. The films however suffer from reduced adhesion. Such monomers exhibit comparatively poor ability to reduce the working viscosity of the oligomer, due to the higher initial viscosity associated with the monomers themselves. Mono functional monomers, conversely, give slow cure speeds and low cross-link density, leading to cured films of lower hardness, tensile strength, and with reduced chemical resistance. Such monomers give films with improved elongation and improved adhesion, and the monomers show a considerably increased capacity to reduce the working viscosity of the oligomer.

Prucnal, et al., U.S. Pat. No. 3,874,906 teach a method of applying and curing a polyester-acrylate containing coating composition comprising adding N-vinylpyrrolidone to the composition and subsequently applying the composition to a substrate and subjecting it to actinic light to cure. Lorenz, et al., U.S. Pat. No. 4,129,709 disclose a coating composition comprising an oligomer produced by reacting polytetrahydrofuran with a diisocyanate, N-vinyl-2-pyrrolidone and an acrylic acid ester having a boiling point of at least 200° C. at 760mm Hg.

Pviola, et al., U.S. Pat. No. 4,348,427 teach a method of coating surfaces by applying to the surface to be coated, a mixture composed by at least one compound such as an epoxy-acrylate resin, a polyester alpha-omega-acrylate resin, an unsaturated polyester resin, or a urethane-acrylate resin and by at least one unsaturated compound of the amide, lactam, piperidone and urea classes and subsequently irradiating the coated surface with radiation in the range of 200 to 400mm.

SUMMARY OF THE INVENTION

The present invention is an improved radiation curable composition comprising an oligomer selected from the group consisting of epoxy-acrylate resins, polyester acrylate resins, polyurethane acrylate resins and mixtures thereof, and N-vinylformamide. A photoinitiator is added to the composition prior to applying the composition to a substrate. Optionally, the composition may contain other reactive monomers such as mono-, di-, or poly-functional acrylic esters, or other vinyl compounds. The present invention also covers a process for coating a substrate surface using the subject composition. In accordance with this process, the composition containing the photoinitiator is applied to the substrate surface and is subsequently exposed to a radiation source until an adherent dry polymerized film is formed on the substrate.

We have discovered that the use of N-vinylformamide as a monomer radiation curable coating formulations results in a superior coating material compared to prior art formulations. Compared to acrylate types of monomers, N-vinylformamide exhibits superior capacity to reduce the working viscosity of the oligomer, and is especially useful with polyurethane acrylate containing formulations with which viscosity reduction is particularly difficult with monomers traditionally used with such systems. Additionally, films cured with N-vinylformamide demonstrate excellent hardness, chemical resistance, flexibility, scuff resistance and scratch resistance.

DETAILED DESCRIPTION OF THE INVENTION

We have discovered improved radiation curable compositions which are useful for forming a hard protective polymer films on substrate surfaces. The composition is an improvement over the prior art in that when N-vinylformamide (NVF) monomer is blended with an acrylic oligomer system, the resultant formulation exhibits improved properties for applications such as protective and decorative coatings, resinous binders for pigmented inks, adhesive materials and the like. We have found that NVF is an effective reactive diluent for radiation curable oligomer systems in that it exhibits low vapor pressure, good solvency, and rapid cure under standard photocure conditions to hard, flexible, clear, colorless coatings. Additionally, NVF significantly reduces working viscosities relative to traditionally used acrylate monomers, particularly in difficultly reducible polyurethane acrylate oligomer systems. Cured polymers made with NVF exhibit improved odor, harder films, good chemical resistance, flexibility, scuff resistance and scratch resistance.

A further advantage of using NVF is that, since NVF is a secondary amide, the amide hydrogen is available as a reactive site for secondary curing reactions. Consequently, under proper conditions, the NVF will combine with species normally reactive with active hydrogen compounds to produce a separate non-volatile induced cure subsequent to or concurrent with free radical polymerization through the vinyl bond. Such secondary curing reactions are characteristic of so-called dual cure systems, and can be useful in modifying the finished properties of the film.

The formulation is made by mixing NVF with an appropriate acrylate resin. The NVF is typically added in a concentration of between about 2 and 40 wt % and preferably between 5 and 25 wt % based on the total composition. The acrylate resins useful for such compositions include epoxy-acrylates, polyester acrylates and polyurethane acrylates. Optionally, the composition may contain other reactive species such as the aforementioned acrylic monomers consisting of mono-, di-, or polyfunctional acrylic esters of suitable low molecular weight alcohols, acrylic esters of ethoxylated or propoxylated alcohols, diols, and triols; or other vinyl monomers.

"Epoxy-acrylates" are the B-hydroxy esters which are generated by the reaction of acrylic acid or methacrylic acid with an epoxy resin. Suitable epoxy resins are the resinous products generated by reaction of Bisphenol-A or Bisphenol-F with epichlorohydrin, and consist of a range of materials including liquid and solid resins of varying molecular weights. Especially preferred are the liquid Bisphenol A - epichlorohydrin condensates with a molecular weight in the range of from 300 - 600. The description "epoxy-acrylate" may also be applied to reaction products of acrylic acid or methacrylic acid with epoxy-novolak resins, that is resin obtained by reaction of epichlorohydrin with a phenol or cresol formaldehyde condensate, and which contain a plurality of glycidyl ether groupings with an epoxy functionality greater than 2. Also included are the comparatively low viscosity epoxy acrylates obtained by reaction of epichlorohydrin with the diglycidyl ether of an aliphatic diol or polyol. Examples of materials which may be reacted with acrylic or methacrylic acid include hexanediol diglycidyl ether, neopentyl glycol diglycidyl ether and butanediol diglycidyl ether.

The polyester acrylates consists of polyesters as defined and described in the above description which have been esterified with acrylic acid to yield a polyester with acrylate ester terminal groups, using well established esterification techniques.

Polyurethane acrylates consist of reaction products of a hydroxyl containing acrylate ester, usually 2-hydroxyethyl acrylate or hydroxy propyl acrylate (1-methyl, 2-hydroxyethyl acrylate) with an isocyanate prepolymer. Such a prepolymer consists of the reaction products of a polyol, which may be a polyether polyol or a polyester polyol, with a di or polyisocyanate. Suitable polyether polyol include for example polyethylene glycols, polypropylene glycols, ethoxylated or propoxylated glycerol or ethoxylated or propoxylated glycerol or ethoxylated or propoxylated trimethylol propane or trimethylol ethane, all of which may have molecular weights in the range of about 1000 to about 6000. Suitable di or polyisocyanates include the aromatic isocyanates such as toluylene di-isocyanate or di phenyl methane di-isocyanate, the araliphatic diisocyanates such as tetramethyl xylylene di-isocyanate, and aliphatic or cycloaliphatic di-isocyanates such as isophorone-diisocyanate, bis-isocyanate cyclohexyl methane, hexamethylene di-isocyanates and alkyl substituted hexamethylene di-isocyanates.

Suitable polyester polyols, which may be reacted with the above range of di or poly isocyanates, include hydroxy terminal polyesters obtained from a wide range of di and poly functional carboxylic acids and a wide range of di and poly functional alcohols. Suitable acids include adipic, sebacic, glutaric and azelaic acids, the isomeric phthalic acids, trimellitic acid and pyromellitic acid. Suitable polyols include for example ethylene and propylene glycols and their oligomers, cyclohexane diols and their ethoxylates and propoxylates, and higher functionality polyols such as glycerol, trimethylol propane and trimethylol ethane and their ethoxylates and propoxylates. Also included are polycaprolactone polyols.

The resultant acrylate oligomer/NVF compositions are mixed with a conventional photoinitiator used in this technology, which include for example, benzophenone, benzoin ethers and related species, as well as cationic photoinitiators. Monomers including t-amino groups may be used in certain formulations as activators for the photoinitiator.

The composition, containing the photoinitiator, is applied to the surface of a substrate and subsequently exposed to a radiation source until an adherent dry polymerized film is formed on the substrate. The composition is useful for placement on a wide range of substrates including paper, rigid and flexible plastics, metallic substrates, cement, glass, asbestos products, wood and the like.

The following examples are presented to better illustrate the present invention and are not meant to be limiting.

EXAMPLE 1

This example demonstrated the effect of increasing the proportion of a mono-functional monomer in a formulation consisting of a blend of Actocryl-305 which is a commercially available polyurethane acrylate of functionality 2. "Actocryl" is a registered trademark of Anchor Chemical Group plc. This data demonstrates the superior viscosity reducing power of N-Vinylformamide when compared to a typical mono-acrylate, i.e., isodecyl acrylate, and also the greater range of compatibility of N-Vinylformamide compared to the mono-acrylate. The viscosities for various formulations using isodecyl acrylate and those using NVF are reported in Tables 1 and 2, respectively. The formulations are in wt % of each component based upon total weight of the formulation.

TABLE 1

| FORMULATION: | A | B | C | D | E | F |
|---|---|---|---|---|---|---|
| Actocryl-305 | 60 | 60 | 60 | 60 | 60 | 60 |
| Tripropylene Glycol Diacrylate | 35 | 30 | 25 | 20 | 15 | 10 |
| Isodecyl Acrylate | 5 | 10 | 15 | 20 | 25 | 30 |
| Viscosity, (poise 25° C.) | 33.3 | 25.7 | 21.7 | 18.5 | 21.0* | Incompatible |

*Cloudy

TABLE 2

| FORMULATION: | G | H | I | J | K | L |
|---|---|---|---|---|---|---|
| Actocryl-305 | 60 | 60 | 60 | 60 | 60 | 60 |
| Tripropylene Glycol Diacrylate | 35 | 30 | 25 | 20 | 15 | 10 |
| N-VinylFormamide | 5 | 10 | 15 | 20 | 25 | 30 |
| Viscosity, (poise 25° C.) | 32.5 | 24.0 | 19.5 | 14.0 | 12.5 | 10.0 |

The results reported in the above tables clearly show that NVF has a significantly greater ability to reduce the viscosity of such a formulation, and also exhibits better compatibility at higher concentrations than the mono-acrylate.

EXAMPLE 2

Formulations B and H from Example 1 were compared for chemical resistance as follows: 100 pts of each formulation were compounded with 3 pts of Irgacure-184 photoinitiator ("Irgacure" is a trade name of Ciba-Geigy). 6 micron varnish films of each formulation were drawn down on aluminum panels and radiation cured at 400 f.p.m. using a 200 watt/in medium pressure lamp.

The chemical resistance of the resultant films was determined by the standard MEK double rub test. The results of this test are set out in Table 3 below:

TABLE 3

| | MEK DOUBLE RUBS | |
|---|---|---|
| No. of passes at 400 f.p.m. | FORMULATION B + 3 phr IRAGURCE 184 | FORMULATION H + 3 phr IRGACURE 184 |
| 4 | 12 | 14 |
| 6 | 10 | 18 |
| 8 | 10 | 34 |
| 10 | 10 (Tacky) | 28 |

The results of Table 3 above show that Formulation H (containing NVF) exhibited superior chemical resistance over Formulation B.

EXAMPLE 3

Since the acrylate ester did not produce a hard film, the hardness of N-Vinylformamide films (formulation H) were assessed against a formulation containing N-Vinylpyrrolidone monomer as taught in the prior art. The formulation containing the N-Vinylpyrrolidone had the composition as set out as Formulation "M" in Table 4.

TABLE 4

| FORMULATION*: | H | M |
|---|---|---|
| Actocryl-305 | 60 | 60 |
| Tripropylene Glycol Diacrylate | 30 | 30 |
| N-Vinylformamide | 10 | — |
| N-Vinylpyrrolidone | — | 10 |
| Irgacure 184 | 3 | 3 |

*all reported as wt % based upon the total weight of the formulation.

24 micron films of Formulations H and M were cast on separate aluminum panels, and hardness was assessed after varying numbers of passes at 400 feet per minute (f.p.m.) radiation exposure using the pendulum hardness technique. The results of this test are set out in Table 5 below.

TABLE 5

| Curing Passes at 400 f.p.m. | FORMULATION H | FORMULATION M |
|---|---|---|
| | NO. OF PENDULUM SWINGS | |
| 4 | 39 | 24 |
| 5 | 42 | 32 |
| 6 | 38 | 40 |
| 8 | 37 | 30 |
| 10 | 44 | 38 |
| 15 | 52 | 40 |

The results reported in Table 5 above show that the films made from Formulation H typically exhibited greater hardness than the formulation using N-vinylpyrrolidone which was commonly used for prior art coating applications.

Having thus described the present invention, what is now deemed appropriate for Letters Patent is set out in the following claims.

We claim:

1. A radiation curable formulation comprising:
   (a) an oligomer selected from the group consisting of epoxy-acrylate resins, polyester acrylate resins, polyurethane acrylate resins and mixtures thereof; and
   (b) N-vinylformamide.

2. The formulation of claim 1 which also contains a mono-, di, or polyfunctional vinyl or acrylic monomer.

3. The formulation of claim 1 wherein N-vinylformamide is present in the formulation from about 2 to 40 wt % of the total formulation.

4. The formulation of claim I wherein said oligomer is a polyurethane acrylate resin.

5. The formulation of claim 4 wherein said polyurethane acrylate is di-functional.

6. The formulation of claim 1 which has a viscosity of between about 32.5 and 10.0 poise.

7. The formulation of claim 1 which also contains a photoinitiator.

8. The formulation of claim 1 wherein N-vinylformamide is present in the formulation from about 5 to 25 wt % of the total formulation.

* * * * *